United States Patent [19]

McNeil

[11] 3,898,068

[45] Aug. 5, 1975

[54] CYCLONIC SEPARATOR

[76] Inventor: John A. McNeil, 251 Butler St., Brookville, Pa. 15825

[22] Filed: May 31, 1974

[21] Appl. No.: 474,939

[52] U.S. Cl. .................. 55/426; 55/337; 55/458; 55/459; 55/462; 55/DIG. 22
[51] Int. Cl. ............................................ B01d 45/16
[58] Field of Search ............ 55/204, 320, 337, 426, 55/459, 448, 449, 458, 461, 462, DIG. 22, DIG. 23, 523, 435; 210/304; 261/83

[56] References Cited
UNITED STATES PATENTS

| 938,656 | 11/1909 | Frickey | 55/459 X |
|---|---|---|---|
| 1,176,732 | 3/1916 | Bowser | 210/304 |
| 1,915,408 | 6/1933 | Crossen | 55/426 X |
| 2,477,935 | 8/1949 | Miller | 55/459 X |
| 3,269,097 | 8/1966 | German | 55/426 X |
| 3,391,787 | 7/1968 | Salomon | 55/459 |
| 3,771,290 | 11/1973 | Stethem | 210/304 X |
| 3,788,044 | 1/1974 | McNeil | 55/204 |

FOREIGN PATENTS OR APPLICATIONS

| 1,027,706 | 7/1955 | France | 55/337 |
| 700,791 | 12/1953 | United Kingdom | 55/426 |
| 22,254 | 4/1935 | Australia | 55/459 |

*Primary Examiner*—Frank W. Lutter
*Assistant Examiner*—David L. Lacey
*Attorney, Agent, or Firm*—Parmelee, Miller, Welsh & Kratz

[57] ABSTRACT

An in-line wet steam or entrained effluent separator of improved efficiency under varied load conditions is provided that employs a perforated or screen-like, downwardly converging, frusto-cone shaped separator basket in a lower portion of the separator for maximizing the efficiency of its centrifugal separating action.

10 Claims, 4 Drawing Figures 3,898,068

CYCLONIC SEPARATOR

BACKGROUND OF THE INVENTION

1. Field of the Invention

This invention relates to an improved cyclonic separating apparatus for removing steam, air, gas or other effluent in a dry or clean condition from a velocity flow of entrained or wet effluent under low to high pressures. A phase of the invention relates to a centrifuge or moisture entrainment separator of an improved overall and relatively constant operating efficiency under varied velocity flow of low to full load conditions.

2. Description of the Prior Art

Separating apparatus currently on the market has been constructed to operate under lower velocities than required for piping systems that are now being designed. Normally, a separating unit, as indicated by curve A' of the graph of FIG. 4, tends to greatly decrease in separating efficiency above a velocity of about 100 feet per second. There is a present need for an optimum-sized apparatus which will have a good and a substantially comparable good efficiency of operation from a lower (low load) velocity up to a full load velocity of, for example, from 100 up to 150 to 300 feet per second. Such an apparatus may then make full use of piping systems for processing and heating, for example, power generation in turbine applications. If a turbine is running at peak capacity, it is desirable that the efficiency of the separator be within at least about 2 percent of its efficiency when running at about one-third of peak capacity.

Another important factor to be met is that of minimization of sound in the operation of the device. In this connection, high frequency sound is not only unpleasantly irksome, but tends to be detrimental to the health of operating personnel.

SUMMARY OF THE INVENTION

It has thus been an object of the present invention to solve the problem presented, particularly from the standpoint of efficiency, and to assure a minimization or lowering of the noise level.

Another object has been to provide an improved separator apparatus which may be used in-line for removing entrained moisture from a hot effluent, such as steam or flowing gas, that will operate in such a manner as to maximize heat retention and dryness, and that will limit condensation during the separating-out action.

A further object of the invention has been to devise an improved separating apparatus for hot effluent which will minimize heat loss, maximize dry effluent output, and maximize heavier particle or moisture separation.

A still further object of the invention has been to provide a separating apparatus which utilizes a central, vortex-like, velocity flow of dry effluent in a downstream converging flow path that is segregated with respect to a downstream movement of moisture being separated therefrom, so that the moisture does not become re-entrained.

These and other objects of the invention will appear to those skilled in the art from the illustrated embodiment.

DESCRIPTION OF THE PREFERRED EMBODIMENT

Figure 1:
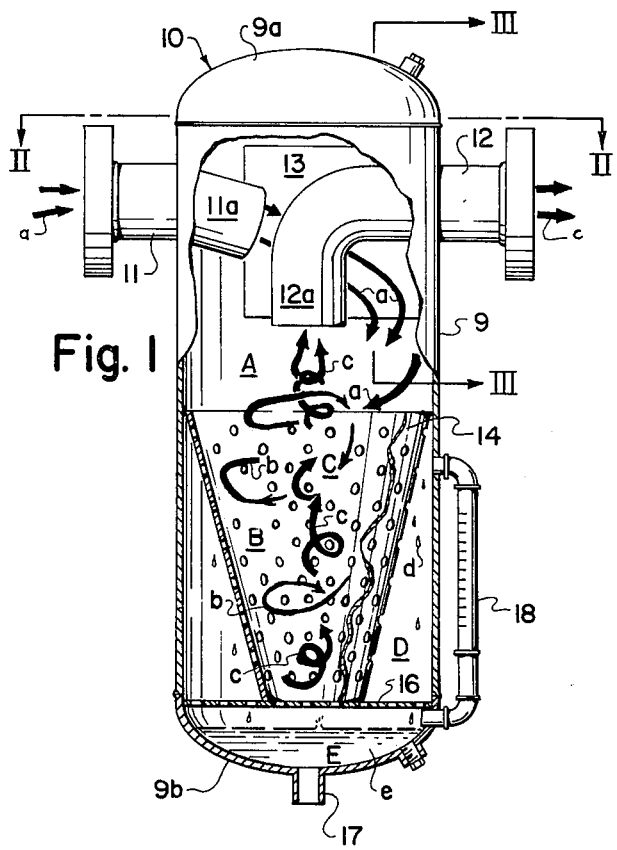
FIG. 1 is a partially broken-away vertical view in elevation of a separating apparatus devised and constructed in accordance with the invention.
Figure 2:
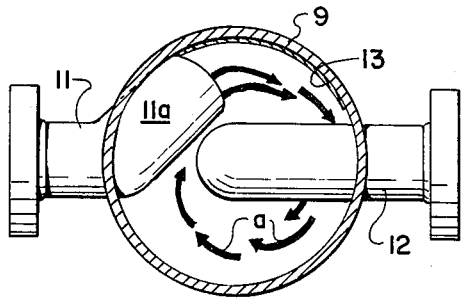
FIG. 2 is a cross-sectional view on the same scale as and taken along the line II—II of FIG. 1.
Figure 3:
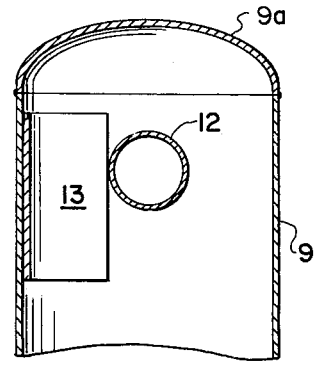
FIG. 3 is a sectional fragment taken along the line III—III of FIG. 1 and particularly showing an upstream portion of the apparatus, an outlet pipe and a striking plate. The plate receives effluent being directed by an inlet pipe (not shown) with a downward declination to provide a downstream flow of effluent in a centrifugal or cyclonic path.
Figure 4:
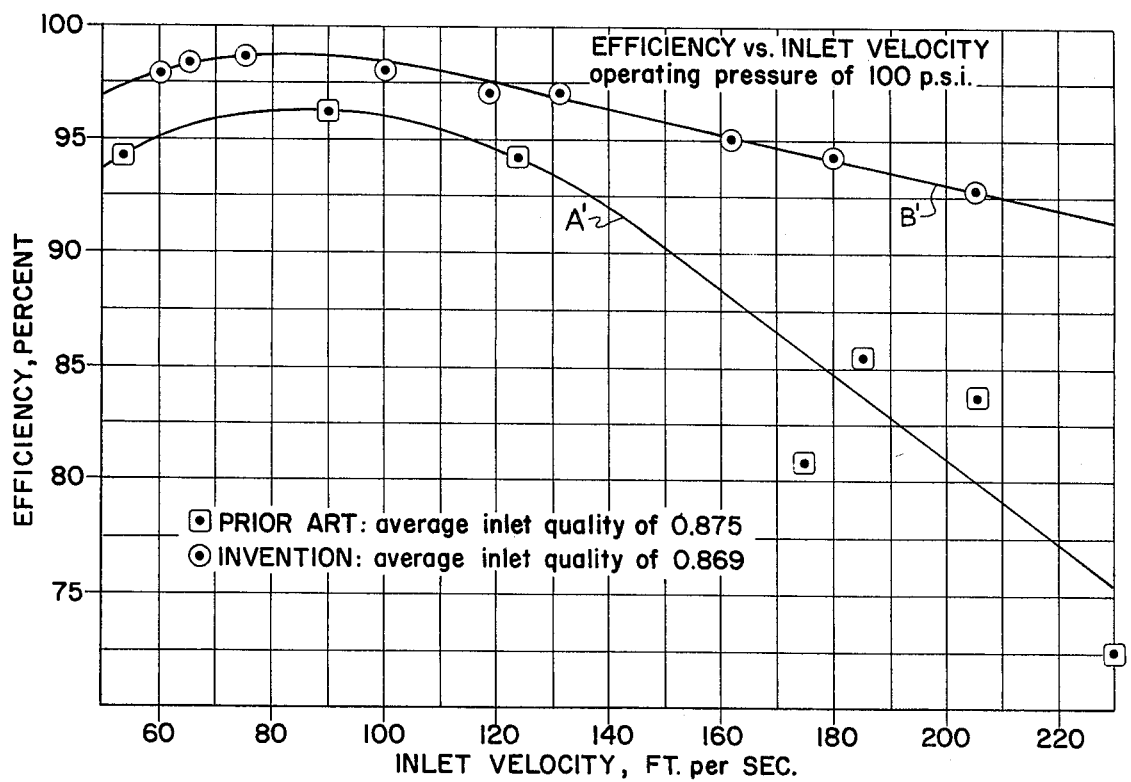
FIG. 4 is a chart showing comparative curves plotted on the basis of percentage of operation efficiency under variations in steam inlet velocity; curve A' shows the efficiency of separating apparatus without the cone-shaped basket of the present invention and curve B' shows the comparative efficiency of apparatus fully constructed in accordance with the invention.

A separating apparatus or unit 10 of improved and substantially constant efficiency for separating-out entrained higher density materials such as moisture from a flow of effluent or of steam, air or gas has been devised. It employs an elongated container or shell having an enclosing side wall 9 of elongated cylindrical shape and is shown provided with convexly outwardly rounded upstream and downstream end walls 9a and 9b defining an axially elongated compartment therein. A tubular inlet pipe member 11 for introducing entrained effluent is open into an upstream end portion of the compartment through the side wall of the container and has an open-end portion 11a that inclines towards a curvilinear baffle plate 13 of a suitable metal, such as stainless steel, that is contoured to the inside surface of the shell and is positioned slightly downstream to introduce the effluent or steam tangentially in a cyclonic, centrifugal path (see arrow a). A tubular outlet or discharge pipe member 12 extends through the side wall, opposite to the tubular inlet 11 and has an angle-shaped inner portion 12a that extends downstream axially centrally of the compartment with the inlet 11 that is open into an upstream first stage separating or processing chamber A. As shown, effluent-receiving open end portion 12a of the tubular discharge member 12 is positioned downstream of an open delivery end portion of the tubular inlet member 11, and with the upper end of a downwardly spaced cone-shaped separator member or basket 14 defines the first stage separating chamber A. The members 11 and 12 define a substantially T-shaped separator with the body of the container.

It will be noted that the flow effected by the tubular inlet member 11 is a centrifugal type of directed movement towards an opposite or downstream end of the container. The carrier effluent outlet member 12 has an effective fluid flow diameter or open end portion at least equal to and not smaller than that of the tubular inlet member 11.

A frusto-conically shaped basket or truncated cone shape separator member 14 has a perforated or screen-like construction and is positioned to extend within the compartment of and along the downstream or opposite end portion of the container and has a convergence towards such end. The basket or cone-shaped member 14 has a large open-mouth upper end portion that is spaced downstream of the open end of the tubular discharge member 12 and within outer reaches of its confines defines a second, intermediate separating or processing chamber portion or zone B. The upper open end portion of the basket 14 is shown corresponding in outer diameter to the inner diameter of the container side wall 9 to extend from and be secured thereto. The basket 14, as shown, in addition to defining a relatively large central area therein downstream of the container that converges in a downstream direction, also with the side wall of the compartment defines an outer, downstream diverging, heavier particle or liquid flow chamber D.

The downstream end of the basket 14 carries a screen-like or perforated partition, end wall or disc-like plate member 16 which extends across the full inside dimension of the container compartment to, with the downstream end wall 9b, define a liquid and heavier particle collecting chamber E. The basket 14 and the end plate 16 provide a unitary cone-shaped unit. As shown, droplets or moisture move downwardly by gravity along the outer chamber D (see arrows d), through perforations in the member 16, and pass into downstream liquid collecting chamber E. Also, a central axial downstream reversal of flow in a vertical or longitudinal direction within the downstream end portion of the basket 14 is accomplished within a third stage separating or processing zone or chamber portion C therein. The downstream movement of the effluent within the second stage chamber portion B assures that heavier particles pass through the wall of the cone 14 and the central portion of the perforated member 16 into the chamber E.

The cone-shaped basket member 14 and the cross extending disc or plate member 16 may serve to locally segregate the downstream swirling steam flow from an outermost swirling flow layer of moisture, condensate or other heavier particles and, at the same time, to enable the heavier particles to move out of the steam path into a downstream gravity flow path of movement. It will be noted that the downstream enlargement of the chamber D serves to prevent entering droplets from striking the wall of separator 14 during their downstream movement. Lighter portions of the steam or hot effluent which have moved downstream in a cone-shaped centrifugal, swirling path b along downstream, intermediate or second stage separating chamber portion B defined by the inner wall of the cone or basket 14, return upwardly or upstream in a vertical direction in an inner swirling vortex flow path along a central downstream third stage separating chamber area portion or zone C within the central longitudinal axis of the second stage chamber B, centrally along first stage chamber A, (see c) to enter and discharge through the tubular outlet member 12 at the upstream or top end of the container or shell.

As will be noted, the upstream vortex first stage chamber A is supplied with wet or entrained effluent in the form of a steam, air or gas pressure fluid. e.g., of 100 psi, by the tubular inlet 11, and downstream of which the pure or dry processed effluent or steam is removed from tertiary downstream separating or process stage chamber portion or area C through the oppositely positioned tubular discharge or outlet member 12. The sidewise-turned or angle-shaped, fully-open delivery end portion 11a of the inlet member 11 slopes tangentially towards the inner side wall of the container to direct the entering velocity flow of entrained effluent in a circumferential, vortex-forming path within and along the inside of the container and directly upon the smooth surface of the protective striking plate 13. It should be emphasized that the tubular inlet member 11 is open to the upstream separating chamber A and that the tubular outlet member 12 is open to the chamber A and to the chamber zones or areas B and C.

Since the vortex downstream flow as represented by the arrows b, causes heavier portions of the effluent to seek an outermost position or path or movement and the lighter portions to seek an innermost position or path of movement within the chamber area or portion B, the heavier portions will progressively move through the holes or perforations in the basket or cone 14 into the chamber D that circumferentially surrounds the outer reaches of the basket wall, and that is positioned between the container side wall 9 and the wall of the basket. The basket 14 terminates at its truncated end in a spaced relation from a bottom end wall 9b of the container 9. The level of liquid or heavier particles e in the chamber E is importantly maintained below or in a downstream spaced relation with respect to the downstream end of the basket 14 and the end wall member 16 by utilizing drain fitting 17 in the downstream end wall 9b. The centrally disposed outlet fitting 17 may be provided with a trap or other conventional means to provide an automatic take-off for the liquid e to maintain its below-level. The outlet 17 has a flow diameter substantially less than the tubular inlet and discharge members 11 and 12 and, as an optimum, may be one-half the diameter thereof. A liquid level gauge 18 is shown connected between the upstream end portion of the chamber D and the liquid collecting chamber D. In smaller separators, e.g., of 3, 4 or 6 inches in diameter, such as used for an air system, a conventional flat float assembly may be employed and used as a bottom terminus for the chamber E.

In FIG. 1, arrows b show the outer swirling, downwardly converging path of the carrier-entrained mixture being supplied within chamber portion or zone B, while d indicates the heavier particles or entrained droplets that are passing downstream as a gravity flow along the chamber D, about outer reaches of the downstream intermediate zone or chamber portion B, and into the liquid collecting chamber E. Entrainment from the central, downstream moving lighter carrier effluent stream b is free to move through the openings in the wall of the cone 14 from the outermost portions of the chamber portion B, and also to move through the openings in the plate or wall disc 16 into the collecting chamber E. The heavier particles d that enter settling chamber D tend to combine with other particles of the same nature and fall away from the wall of the cone 14 in such a manner as to prevent re-entry into the chamber area B.

I have found that for fluids supplied from a steam generator, boiler or the like within velocities of about 50 to 300 ft./sec., the cone 14 may have an included angular relation with respect to the vertical or longitudinal axis of the separator within a range of about 10° to 30°, with an optimum of about 15°. Thus, the range is about 5° to 15° outwardly from such axis with an optimum of about 7.5°. The downward or downstream slope or convergence should be such that only the outer, highest density area or the outer portions of the down-flowing cyclonic or centrifugal effluent portions will contact the inner side surface of the separator cone 14. The slope corresponds substantially to a down-stream convergence of the circling effluent flow (see arrows b) within the area of the downstream separating chamber portion B. A suitable spaced relation between the holes or perforations in the members 14 and 16 is represented by the provision of an open area to percentage of metal or closed wall area within a range of about 23 to 30 percent. For example, holes of about 1/16 of an inch in diameter with a spacing of about 1/8 of an inch therebetween (representing about 23 percent) or of about 3/32 of an inch in diameter with about 3/16 of an inch therebetween (representing about 25 percent) provide good results. A suitable length extent of the separator cone 14 is represented by the longitudinal extent of the cylindrical upper portion of the container compartment between the upstream end wall 9a and the upstream open end portion of the separator basket or cone 14 or thus, by substantially the longitudinal extent of the first-stage chamber A.

I claim:

1. In a liquid entrainment separating apparatus having an improved separating efficiency when subjected to increased inlet velocities in recovering the substantially dry gaseous content of a pressure effluent being supplied, an elongated container having a substantially cylindrical side wall and upper and lower closing-off end walls defining an elongated compartment therein, said compartment terminating in upper and lower end portions, a tubular inlet member extending into said container and having an end portion open to the upper end portion of the compartment and constructed to introduce entrained effluent therein in a cyclonic path therewithin, a tubular discharge member for receiving dry gaseous effluent extending into the container along the upper end portion and having an open end portion extending centrally downwardly to a substantially intermediate position between the upper and lower end portions of the compartment and open below the open end portion of said tubular inlet member, a cone-shaped separating member of perforated wall construction having an upper wide-mouth open end portion substantially corresponding in diameter to an inner diameter of said side wall of said container and in a downwardly spaced relation with respect to the open end portion of said tubular discharge member, spacing within the compartment between the open end portion of said tubular discharge member and the upper wide-mouth open end portion of said separating member that is fully open and unobstructed therebetween to define a first-stage processing chamber above said separating member, said separating member being positioned within the compartment to extend in a downwardly converging relation and having a fully open spacing between its diverging and its converging ends to define a cone-shaped second-stage processing chamber therewithin adjacent its inner surface and to define a third-stage processing chamber axially centrally thereof that extends upwardly along and is fully open to said first and second-stage processing chambers to discharge substantially dry gaseous effluent into the open end portion of said tubular outlet member, said separating member being secured in position with respect to and defining with the side wall of the container an outer downwardly-diverging liquid-flow chamber to receive higher density particles of the effluent through the perforated wall thereof from said second-stage processing chamber, said separating member declining towards and having a truncated lower end portion in a spaced-apart relation with respect to said lower end wall to define a liquid collecting chamber within the lower end portion of said container for receiving condensate and heavier particles of the effluent from the liquid-flow chamber and the second-stage processing chamber, and a drain extending through said lower end wall for maintaining a level of liquid within said collecting chamber below said truncated end portion.

2. In a separating apparatus as defined in claim 1, said tubular discharge member having a flow diameter at least as large as the flow diameter of said tubular inlet member.

3. In a separating apparatus as defined in claim 1, said tubular discharge member being of angle shape to extend transversely through said side wall and longitudinally centrally along the compartment towards the wide-mouth open end portion of said separating member to receive dry effluent from a position that is substantially centrally aligned with the longitudinal axis of the compartment, the open ends of said tubular inlet and discharge members having substantially the same fluid flow diameters, and said drain having a flow diameter that is substantially less than the flow diameters of said tubular inlet and discharge members.

4. In a separating apparatus as defined in claim 3, said separating member having a longitudinal extent substantially corresponding to the longitudinal extent of the upper end portion of the compartment between the upper end wall and the wide-mouth open end portion of said separating member.

5. In a separating apparatus as defined in claim 1, a cross-extending perforated member cooperating with said separating member and the inside of said side wall of the container to provide a lower through-flow wall extending across said truncated lower end portion of said separating member and across the lower end of the liquid flow chamber and upwardly of said liquid collecting chamber.

6. In a separating apparatus as defined in claim 5, the wall of said separating member having a declination with respect to the longitudinal axis of the compartment towards said truncated end portion within a range of about 5° to 15°.

7. In a separating apparatus as defined in claim 5, said cross-extending perforated member and the perforated wall of said separating member having open portions therethrough in a spaced-apart relation with respect to each other to provide a ratio of their open to closed wall areas within a range of about 23 to 30 percent.

8. In a separating apparatus as defined in claim 1, the declination of said separating member being about 7.5° with respect to the longitudinal axis of the compartment.

9. In a separating apparatus as defined in claim 1, the perforated wall of said separating member having open portions therethrough in a spaced-apart relation with respect to each other to provide a range of its open to closed wall area within about 23 to 30 percent.

10. In a liquid entrainment separating apparatus having the capability of good operating efficiency under increased load conditions and an improved overall efficiency in recovering a substantially dry gaseous content of a pressure fluid that is being supplied by a boiler or the like, a container having a substantially circular enclosing side wall and opposed enclosing upper and lower end walls defining an elongated compartment therein, said compartment terminating in upper and lower end portions, a tubular inlet member for entrained effluent extending through the side wall of said container and having an angular end portion along the inside of the circular wall and open to the compartment within the upper end portion thereof, a tubular effluent discharge member extending through the side wall of said container within the upper end portion of the compartment in an oppositely positioned relation with respect to said tubular inlet member, said tubular discharge member having an angular downwardly turned shape whose inner portion extends centrally of the compartment along a longitudinal axis thereof and terminates in an open end portion that is spaced below the open end portion of said tubular inlet member and that is open towards the lower end portion of the compartment, a curvilinear striking plate secured within the upstream end portion of the compartment, the open end portion of said tubular inlet member extending tangentially within the compartment upwardly of the open end portion of said tubular discharge member and cooperating with the open end portion of said inlet member to direct flow of tangentially entering effluent in a circumferential vortex-forming path against and along said striking plate and in a centrifugal downwardly advancing path within the compartment, a separating basket of perforated wall construction positioned within and extending along the compartment in a downwardly advanced spaced-apart relation with respect to the open end portion of said discharge member, said basket having a large diameter upper open end portion and extending from and in a downwardly-sloped convergence with respect to the side wall of said container to terminate in a smaller diameter lower end portion, the upper open end portion of said basket defining an upper first processing chamber with the open end portion of said tubular discharge member within the compartment, said basket centrally defining a second and lower processing chamber within the compartment of a relatively large area for receiving and directing centrifugal movement of effluent downwardly therealong, said basket circumferentially defining a lower liquid flow chamber about its outer reaches of relatively lesser area than said second and lower processing chamber for receiving higher density particles and condensate through the perforated wall of said basket and directing them downwardly therealong, a perforated plate-like end member extending across the lower end portion of said basket to the side wall of said container in an upwardly spaced relation with the lower end wall of said container for receiving higher density particles and moisture from the liquid flow chamber and the second and lower processing chamber, a drain in the lower end portion of said container for maintaining the level of liquid within said liquid collecting chamber below said platelike end member; and the apparatus including said basket and said tubular discharge member being adapted to, in combination, flow processed dry effluent substantially centrally in a counterflow upstream path from the second and lower processing chamber along the upper first processing chamber into the open end portion of and out through said tubular discharge member.

* * * * *